(12) United States Patent
Kuroki et al.

(10) Patent No.: US 6,467,288 B2
(45) Date of Patent: Oct. 22, 2002

(54) HEAT-PUMP WATER HEATER

(75) Inventors: Jyouji Kuroki, Kariya (JP); Hisayoshi Sakakibara, Nishio (JP); Tomoaki Kobayakawa, Tokyo (JP); Kazutoshi Kusakari, Urawa (JP); Michiyuki Saikawa, Zushi (JP)

(73) Assignees: Denso Corporation, Kariya (JP); Tokyo Electric Power Company, Tokyo (JP); Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 09/892,252

(22) Filed: Jun. 27, 2001

(65) Prior Publication Data

US 2002/0000094 A1 Jan. 3, 2002

(30) Foreign Application Priority Data

Jun. 28, 2000 (JP) ........................................ 2000-194325

(51) Int. Cl.$^7$ ............................ F25B 41/00; F25B 27/00
(52) U.S. Cl. ............................ 62/197; 62/238.6; 62/184
(58) Field of Search ................................ 62/160, 238.6, 62/238.7, 197, 324.1, 184

(56) References Cited

U.S. PATENT DOCUMENTS

| | | | | |
|---|---|---|---|---|
| 5,172,564 A | * | 12/1992 | Reedy | 62/160 |
| 5,239,838 A | * | 8/1993 | Tressler | 62/324.1 |
| 5,249,432 A | * | 10/1993 | Ichikawa | 62/197 |
| 5,272,885 A | * | 12/1993 | Watanabe | 62/184 |
| 5,291,941 A | | 3/1994 | Enomoto et al. | |
| 5,323,617 A | * | 6/1994 | Ichikawa | 62/129 |
| 5,628,200 A | * | 5/1997 | Pendergrass | 62/197 |
| 5,711,161 A | * | 1/1998 | Gustafson | 62/197 |
| 6,327,868 B1 | * | 12/2001 | Furuya | 62/197 |

FOREIGN PATENT DOCUMENTS

| | | |
|---|---|---|
| DE | 32 19 277 A1 | 12/1982 |
| DE | 199 55 339 A1 | 5/2000 |
| JP | U-58-28260 | 8/1956 |
| JP | A-60-250 | 1/1985 |
| JP | A-62-108970 | 5/1987 |
| JP | A-1-193561 | 8/1989 |
| JP | A-3-84359 | 4/1991 |
| JP | U-6-73652 | 10/1994 |
| JP | A-9-236316 | 9/1997 |
| JP | A-9-264632 | 10/1997 |
| JP | A-10-288411 | 10/1998 |

* cited by examiner

Primary Examiner—William C. Doerrler
(74) Attorney, Agent, or Firm—Harness, Dickey & Pierce, PLC

(57) ABSTRACT

In a heat-pump water heater, a control unit has a heat-radiation determining means for determining a heat radiation from refrigerant to outside air in an air heat exchanger based on a water temperature flowing into a water heat exchanger, and the control unit selectively performs a general cycle operation and a bypass operation in accordance with a determination result of the heat-radiation determining means. That is, when the water temperature flowing into the water heat exchanger is lower than 60° C., the general cycle operation is performed. On the other hand, when the water temperature is equal to or higher than 60° C., the bypass operation is performed.

17 Claims, 4 Drawing Sheets

| ΔT | ΔT < 10°C | ΔT > 10°C |
|---|---|---|
| OPERATION OF EXPANSION VALVE | INCREASE OPENING DEGREE | DECREASE OPENING DEGREE |

HEAT-PUMP WATER HEATER

CROSS-REFERENCE TO RELATED APPLICATION

This application is related to Japanese Patent Application No. 2000-194325 filed on Jun. 28, 2000, the contents of which are hereby incorporated by reference.

BACKGROUND OF THE INVENTION

1. Field of the Invention:

The present invention relates to a heat-pump water heater that heats water using a heat pump cycle as a heating source. More particularly, the present invention relates to a heat-pump water heater which prevents a heat radiation from refrigerant to outside air in an air heat exchanger of a heat pump cycle.

2. Description of Related Art:

When freon (e.g., R22) is used as refrigerant in a heat-pump water heater, temperature of heated water is only increased to about 65° C. In this case, because it is impossible to increase the water temperature to a high target supply temperature (e.g., 90° C.) only using the heat-pump water heater, water heated by the heat-pump water heater is further heated using an electrical heater until hot water having the high-target supply temperature is obtained.

To overcome this problem, when carbon dioxide is used as refrigerant in a super-critical (trans-critical) heat-pump water heater, because a high-pressure side refrigerant pressure becomes higher as compared with a general heat-pump water heater using freon as refrigerant, the water temperature to be supplied can be increased to 90° C. without using an electrical heater. However, in the super-critical heat-pump water heater, the high-pressure side refrigerant pressure of a heat pump cycle is controlled by an expansion valve so that a temperature difference between a temperature of refrigerant flowing out from a water heat exchanger and a temperature Tw of water flowing into the water heat exchanger becomes approximately constant (e.g., 10° C.). Therefore, as shown by the p-h diagram in FIG. 7, when the temperature Tw of water flowing into the water heat exchanger is increased, the opening degree of the expansion valve is gradually increased for increasing the refrigerant temperature discharged from the water heat exchanger. When the opening degree of the expansion valve becomes larger, the high-pressure side refrigerant pressure Ph of the heat pump cycle is reduced, a water-heating capacity Q of the heat pump cycle is reduced, and it is difficult to increase the supply water temperature to the high-target supply temperature. Further, when the water temperature Tw flowing into the water heat exchanger becomes equal to or higher than 60° C., the refrigerant temperature discharged from the water heat exchanger becomes higher, heat of refrigerant may be radiated to outside air in an air heat exchanger, and cycle efficiency of the heat pump cycle becomes lower.

SUMMARY OF THE INVENTION

In view of the foregoing problems, it is an object of the present invention to provide a heat-pump water heater for heating water using a heat pump cycle as a heating source, in which a heat radiation from refrigerant to outside air in an air heat exchanger is restricted so that a cycle efficiency can be improved.

According to the present invention, in a heat-pump water heater for heating water using a heat pump cycle as a heating source, a control unit controls operation of the heat pump cycle to set one of a general cycle operation where refrigerant flowing from a water heat exchanger is supplied to an air heat exchanger after being decompressed in an expansion valve, and a bypass operation where refrigerant from the water heat exchanger flows through the bypass passage to be sucked into a compressor while bypassing the expansion valve and the air heat exchanger. The control unit has a water temperature sensor for detecting a water temperature flowing into the water heat exchanger, and a heat-radiation determining member which determines whether or not a heat radiation from refrigerant to outside air will occur in the air heat exchanger based on the water temperature. In addition, the control unit performs the bypass operation when the heat radiation is determined by the heat-radiation determining member. Accordingly, in the air heat exchanger of the heat-pump water heater, heat radiation from refrigerant to outside air can be effectively restricted, and a cycle efficiency of the heat pump cycle can be improved.

Preferably, the heat-radiation determining member has first heat-radiation determining means for determining whether or not there is a possibility of the heat radiation from refrigerant to outside air in the air heat exchanger based on the water temperature, and second heat-radiation determining means for determining the heat radiation based on a comparison between a refrigerant temperature flowing into the air heat exchanger and a temperature of outside air flowing into the air heat exchanger when the first heat-radiation determining means determines the possibility of the heat radiation. Further, the control unit performs the bypass operation when the second heat-radiation determining means determines that the heat radiation will occur. Accordingly, the heat radiation can be accurately determined, and the heat radiation from refrigerant to air in the air heat exchanger can be further restricted.

Alternatively, the heat-radiation determining member has first heat-radiation determining means for determining whether or not there is a possibility of the heat radiation from refrigerant to outside air in the air heat exchanger based on the water temperature, and second heat-radiation determining means for determining the heat radiation based on a comparison between a refrigerant temperature flowing into the air heat exchanger and a refrigerant temperature flowing out from the air heat exchanger when the first heat-radiation determining means determines the possibility of the heat radiation. Further, the control unit performs the bypass operation when the second heat-radiation determining means determines that the heat radiation will occur. Accordingly, the heat radiation can be accurately determined, and the heat radiation from refrigerant to air in the air heat exchanger can be further restricted.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
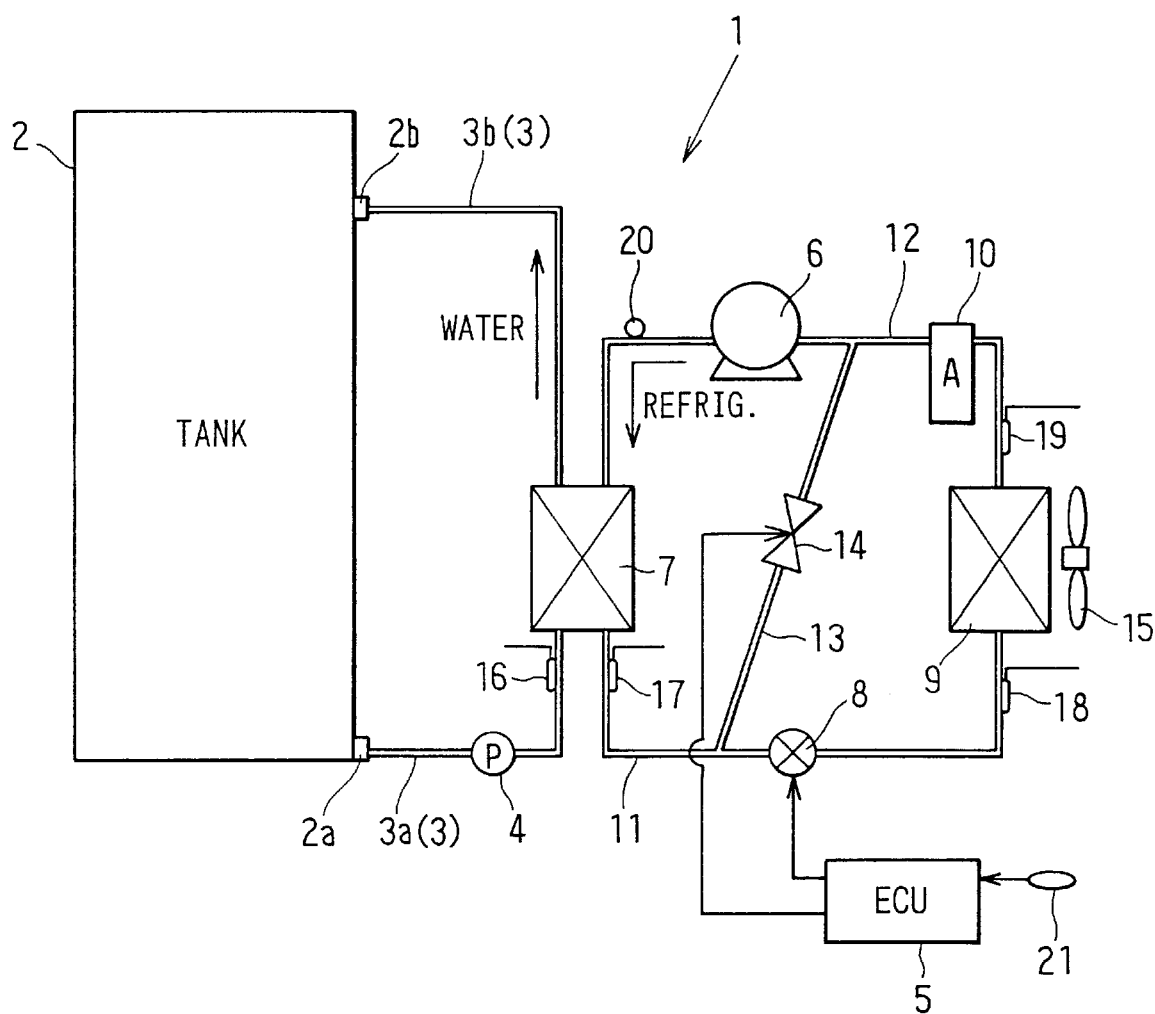
FIG. 1 is a schematic diagram of a heat-pump water heater according to a first preferred embodiment of the present invention.

A first preferred embodiment of the present invention will be now described with reference to FIGS. 1–5. As shown in FIG. 1, a heat-pump water heater 1 is a hot water supply system, in which heated hot water is stored in a tank 2 and is supplied to a user after being temperature-adjusted. The heat-pump water heater 1 includes the tank 2, a water pipe 3 through which the tank 2 is connected with a water heat exchanger 7, a water pump 4 forcibly circulating water in a water circuit, a super-critical (trans-critical) heat pump cycle, and an electronic control unit (ECU) 5 for controlling operation of the heat-pump water heater 1.

The tank 2 is made of a metal having a corrosion resistance, such as a stainless steel, and has a heat insulating structure so that high-temperature hot water can be stored for a long time. Hot water stored in the tank 2 can be supplied to a kitchen, a bath or the like after being temperature-adjusted, and can be used as a heating source for a floor heater or a room heater or the like.

The water pipe 3 is constructed by a first pipe 3a and a second pipe 3b. One end side of the first pipe 3a is connected to a water outlet 2a provided at a lower side in the tank 2, and the other end side of the first pipe 3a is connected to an inlet side of a water passage of the water heat exchanger 7. On the other hand, one end side of the second pipe 3b is connected to a hot water inlet 2b provided at an upper side in the tank 2, and the other end side of the second pipe 3b is connected to an outlet of the water passage of the water heat exchanger 7. Accordingly, by the operation of the water pump 4, water from the water outlet 2a of the tank 2 flows through the first pipe 3a, the water passage of the water heat exchanger 7 and the second pipe 3b, and returns into the tank 2 from the hot water inlet 2b. A water amount (flow rate) circulating in the water circuit can be adjusted in accordance with a rotation speed of a motor disposed in the water pump 3.

The super-critical heat pump cycle uses carbon dioxide having a low-critical pressure as refrigerant, for example, so that a high-pressure side refrigerant pressure becomes equal to or greater than the critical pressure of carbon dioxide. As shown in FIG. 1, the heater pump cycle includes a compressor 6, the water heat exchanger 7, an expansion valve 8, an air heat exchanger 9, an accumulator 10, high-pressure side and low-pressure side refrigerant pipes 11, 12 connecting those components of the heat pump cycle, a bypass pipe 13 and a bypass valve 14 disposed in the bypass pipe 13. Through the high-pressure side refrigerant pipe 11, high-pressure side refrigerant from the compressor 6, before being decompressed in the expansion valve 8, flows. Through the low-pressure side refrigerant pipe 12, low-pressure side refrigerant after being decompressed in the expansion valve 8 flows.

The compressor 6 is driven by an electrical motor provided therein. The compressor 6 compresses sucked gas refrigerant by the rotation of the electrical motor, so that refrigerant discharged from the compressor 6 has a pressure equal to or greater than the critical pressure of refrigerant. The refrigerant amount discharged from the compressor 6 changes in accordance with a motor rotation speed. The water heat exchanger 7 is disposed to perform a heat exchange between high-temperature high-pressure gas refrigerant discharged from the compressor 6 and water pumped from the water pump 4. In the water heat exchanger 7, a flow direction of refrigerant flowing through the refrigerant passage is opposite to a flow direction of water flowing through the water passage.

The expansion valve 8 is constructed so that a valve opening degree can be electrically adjusted by the control unit 5 (ECU). The expansion valve 8 is disposed between a downstream side of the water heat exchanger 7 and an upstream side of the air heat exchanger 9 in a refrigerant flow direction, and decompresses refrigerant cooled in the water heat exchanger 7 in accordance with a valve opening degree. An outside fan 15 for blowing air (i.e., outside air) toward the air heat exchanger 9 is disposed so that refrigerant decompressed in the expansion valve 8 is heat-exchanged with outside air in the air heat exchanger 9. Therefore, refrigerant is evaporated in the air heat exchanger 9 by absorbing heat from air.

Refrigerant from the air heat exchanger 9 flows into the accumulator 10 and is separated into gas refrigerant and liquid refrigerant in the accumulator 10. Only separated gas refrigerant in the accumulator 10 is sucked into the compressor 6, and surplus refrigerant in the heat pump cycle is stored in the accumulator 10.

One end of the bypass pipe 13 is connected to the high-pressure side refrigerant pipe 11 between the water heat exchanger 7 and the expansion valve 8, and the other end of the bypass pipe 13 is connected to the low-pressure side refrigerant pipe 12 between the accumulator 10 and the compressor 6. In the first embodiment, the bypass valve 14 is an electromagnetic valve electrically controlled by the control unit 5. The bypass valve 14 is disposed in the bypass pipe 13 so that a flow amount of refrigerant flowing through the bypass pipe 13 can be changed in accordance with a valve opening degree of the bypass valve 14.

In addition, the heat-pump water heater 1 includes plural sensors such as a water temperature sensor 16 for detecting the temperature Tw of water flowing into the water heat exchanger 7, a first refrigerant temperature sensor 17 for detecting temperature Tr of refrigerant discharged from the water heat exchanger 17, a second refrigerant temperature sensor 18 for detecting temperature Tr' of refrigerant flowing into the air heat exchanger 9, a third refrigerant temperature sensor 19 for detecting temperature of refrigerant flowing out from the air heat exchanger 9, a pressure sensor 20 for detecting a high-pressure side refrigerant pressure in the heat pump cycle and an outside air temperature sensor 21 for detecting temperature Tam of outside air. Detection signals from the sensors 16–21 are input into the control unit 5, and the control unit 5 controls operation of equipments of the heat pump cycle, such as the expansion valve 8 and the bypass valve 14.

In the first embodiment, the control unit 5 has a heat-radiation determining means (step S20 in FIG. 3) for determining whether or not a heat radiation from refrigerant to outside air is generated in the air heat exchanger 9, and selectively performs a general cycle operation or a bypass operation in accordance with a determination result of the heat-radiation determining means.

In the first embodiment of the present invention, when the water temperature Tw flowing into the water heat exchanger 7 is equal to or higher than $60_C$, the heat-radiation determining means determines that heat radiation from refrigerant to outside air will occur in the air heat exchanger 9. In the first embodiment, the determining value of the water temperature Tw is set at $60_C$ based on the following reason.

In the heat-pump water heater 1, the ECU 15 controls the high-pressure side refrigerant pressure in the heat pump cycle based on a temperature difference $\Delta T$ between the water temperature Tw flowing into the water heat exchanger 7 and the refrigerant temperature Tr flowing out from the water heat exchanger 7, so that the temperature difference $\Delta T$ becomes approximately constant (e.g., 10° C.). When the water temperature Tw flowing into the water heat exchanger 7 increases, the opening degree of the expansion valve 8 becomes larger for increasing the refrigerant temperature Tr flowing out from the water heat exchanger 7. However, when the water temperature Tw becomes equal to or higher than a predetermined temperature (e.g., 60° C.), the expansion valve 8 is substantially fully opened, and the refrigerant temperature after decompression is maintained at 60° C. or more. In this case, when the high-temperature refrigerant having a temperature higher than the outside air temperature directly flows into the air heat exchanger 9, heat radiation from refrigerant to outside air will occur in the air heat exchanger 9.

Because the heat radiation from refrigerant to outside air will occur in the air heat exchanger 9 when the water temperature Tw flowing into the water heat exchanger 7 becomes equal to or higher than 60° C., the determining value of the water temperature Tw is set at 60° C. However, the determining value of the water temperature Tw can be changed.

Figures 2, 3:
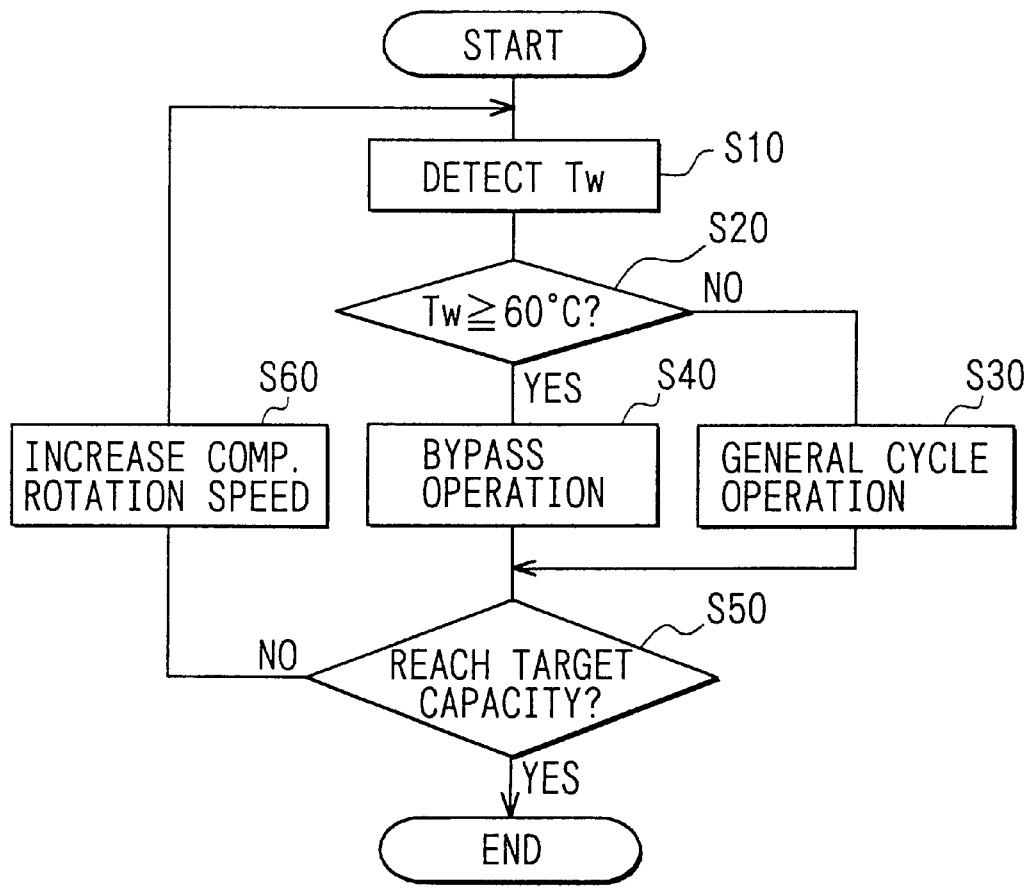
FIG. 2 is a view for explaining operation of an expansion valve in a general cycle operation according to the first embodiment.
FIG. 3 is a flow diagram showing a control process of an electronic control unit (ECU), for determining a heat radiation, according to the first embodiment.

Next, operation of the heat-pump water heater 1 will be described. In a general cycle operation of the heat-pump water heater 1, the bypass valve 14 is closed. In this case, high-temperature high-pressure refrigerant compressed in the compressor 6 is heat-exchanged with water flowing through the water heat exchanger 7, and is supplied to the expansion valve 8 to be decompressed in accordance with the opening degree of the expansion valve 8 while bypassing the bypass pipe 13. Low-temperature low-pressure refrigerant decompressed in the expansion valve 8 is evaporated in the air heat exchanger 9 by absorbing heat from outside air blown by the outside fan 15. Refrigerant from the air heat exchanger 9 flows into the accumulator 10, and separated gas refrigerant is sucked into the compressor 6 from the accumulator 10. In the general cycle operation, as shown in FIG. 2, when the temperature difference $\Delta T$ is lower than 10° C., the opening degree of the expansion valve 8 is increased. On the other hand, when the temperature difference $\Delta T$ is higher than 10° C., the opening degree of the expansion valve 8 is decreased. Accordingly, in the general cycle operation of the heat-pump water heater 1, the opening degree of the expansion valve 8 is controlled so that the temperature difference $\Delta T$ becomes approximately constant (e.g., 10° C.).

On the other hand, in the bypass operation of the heat-pump water heater 1, the bypass valve 14 is opened and the expansion valve is closed by the control unit 5. Accordingly, in this case, high-temperature high-pressure refrigerant compressed in the compressor 6 is heat-exchanged with water flowing through the water heat exchanger 7 to be cooled, and flows into the bypass pipe 13 to be decompressed in accordance with the opening degree of the bypass valve 14. Thereafter, refrigerant decompressed in the bypass valve 14 is sucked into the compressor 6. In the bypass operation of the heat-pump water heater 1, the opening degree of the bypass valve 14 is controlled based on the high-pressure side refrigerant pressure in the heat pump cycle so that a predetermined water-heating capacity can be obtained. Generally, the decompression capacity of the bypass valve 14 is set to be smaller than that of the expansion valve 8.

Because refrigerant flowing through the bypass pipe 13 is compressed to a pressure equal to or greater than the critical pressure of refrigerant in the compressor 6, refrigerant flowing through the bypass pipe 13 is not condensed even when being heat-radiated to water in the water heat exchanger 8, and gas refrigerant is sucked from the bypass pipe 13 into the compressor 6. In the bypass operation of the heat-pump water heater 1, refrigerant flows through the bypass pipe 13 while bypassing the expansion valve 8 and the air heat exchanger 9, and the operation of the outside fan 15 is stopped. Accordingly, consumed electrical power can be reduced in the heat-pump water heater 1.

Next, the control process of the control unit 5 according to the first embodiment will be now described with reference to FIG. 3. First, at step S10, the water temperature Tw flowing into the water heat exchanger 7 is detected by the water temperature sensor 16. Next, at step S20, it is determined whether or not the water temperature Tw is equal to or higher than a predetermined temperature (e.g., 60° C.). When the water temperature Tw is lower than 60° C., the general cycle operation is performed at step S30. On the other hand, when the water temperature Tw us equal to or higher than 60° C., the bypass operation is performed at step S40. Thereafter, at step S50, it is determined whether or not a target water-heating capacity reaches. When the target water-heating capacity reaches at step S50, the control program in FIG. 3 is finished. On the other hand, when the target water-heating capacity does not reach at step S50, the rotation speed of the compressor 6 is increased at step S60 so that the target water-heating capacity can be obtained. Thereafter, the control program returns to step S10.

Figure 5:
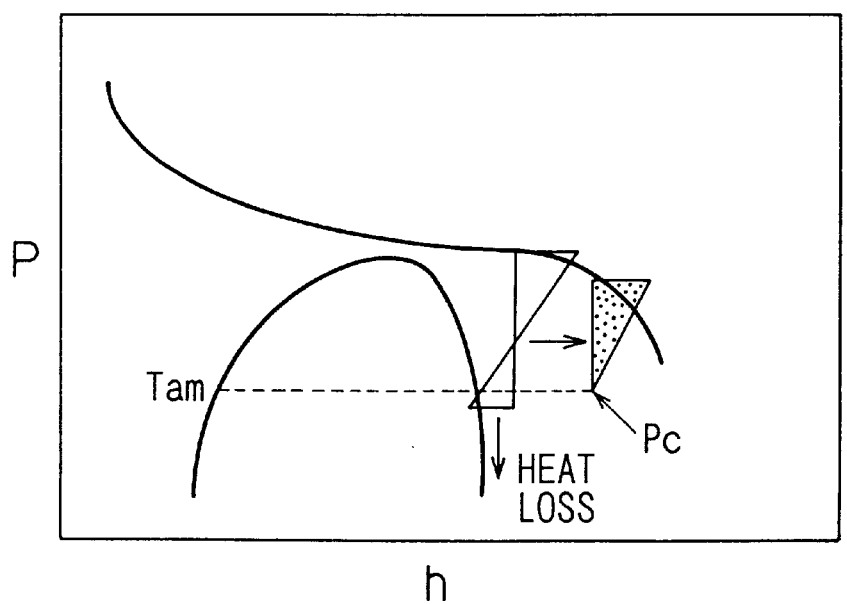
FIG. 5 is a p-h diagram (Mollier diagram) for explaining a heat-loss reduced effect according to the first embodiment.

According to the heat-pump water heater 1 of the first embodiment, the radiation condition on which heat radiation from refrigerant to outside air will occur in the air heat exchanger 9 is determined by the water temperature Tw flowing into the water heat exchanger 7, and the bypass operation is performed when the radiation condition is satisfied. In the bypass operation, because high-temperature refrigerant flowing from the water heat exchanger 7 is sucked into the compressor 6 through the bypass pipe 13 while bypassing the air heat exchanger 9, the heat radiation from refrigerant to outside air in the air heat exchanger 9 can be prevented. As a result, as shown in FIG. 5, because the heat loss of refrigerant in the air heat exchanger 9 does not occur, the water-heating capacity corresponding to the consumed power of the compressor 6 can be obtained. In FIG. 5, Pc indicates a compression start point.

According to the heat-pump water heater 1 of the present invention, the radiation condition, on which the heat radiation from refrigerant to outside air will occur in the air heat exchanger 9, is determined based on the water temperature Tw flowing into the water heat exchanger 7. When the water temperature Tw flowing into the water heat exchanger 7 is equal to or higher than $60_C$ satisfying the radiation condition, the bypass operation is performed. In the bypass operation, high-temperature refrigerant flowing from the water heat exchanger 7 is sucked into the compressor 6 through the bypass pipe 13 while bypassing the air heat exchanger 9. That is, in the bypass operation, refrigerant does not flow into the air heat exchanger 9, the heat radiation from refrigerant to outside air in the air heat exchanger 9 can be prevented. As a result, as shown in FIG. 5, the heat loss in the air heat exchanger 9 can be prevented, and water-heating capacity corresponding to the consumed power of the compressor 6 can be obtained.

Figure 4:
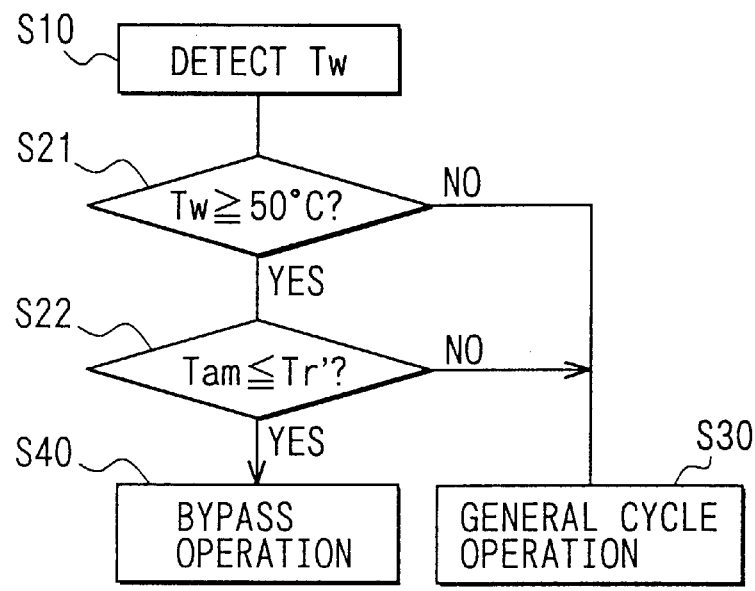
FIG. 4 is a flow diagram showing an another control process of the ECU, for determining the heat radiation, according to the first embodiment.

In the above-described first embodiment, the heat radiation from refrigerant to outside air can be determined based on the determination method shown in FIG. 4. When high-pressure side refrigerant pressure changes by the operation of the compressor 6, the temperature of the high-pressure side refrigerant also changes. Accordingly, even when a heat-exchanging amount (heat radiation amount) of refrigerant in the water heat exchanger 7 is the same, the heat radiation of refrigerant may occur in accordance with the high-pressure refrigerant temperature. Therefore, in FIG. 4, a water temperature (e.g., equal to or higher $50_C$), in which it is possible to cause the heat radiation of refrigerant in the air heat exchanger 9, is detected, and the bypass operation is performed when an actual heat-radiation condition is detected in the water temperature.

That is, as shown in FIG. 4, at step S10, the water temperature Tw flowing into the water heat exchanger 7 is detected by the water temperature sensor 16. Next, at step S21 (first heat-radiation determining means), it is determined whether or not the water temperature Tw flowing into the water heat exchanger 7 is equal to or higher than 50° C. that is the water temperature possible to cause the heat radiation in the air heat exchanger 7. When the water temperature Tw is lower than 50° C., the general cycle operation of the heat-pump water heater 1 is performed. On the other hand, when the water temperature Tw is equal to or higher than 50° C., it is determined whether or not a refrigerant temperature Tr' flowing into the air heat exchanger 9 is equal to or higher than the outside air temperature Tam at step S22 (second heat-radiation determining means). That is, at step S22, the actual heat-radiation condition is determined. When the refrigerant temperature Tr' detected by the second refrigerant temperature sensor 18 is lower than the outside air temperature Tam detected by the outside air temperature sensor 21, the general cycle operation is performed at step S30. On the other hand, when the refrigerant temperature Tr' flowing into the air heat exchanger 9 is equal to or higher than the outside air temperature Tam, it is determined that the heat radiation from refrigerant to outside air will occur, and the bypass operation is performed at step S40. At step S22, the heat radiation from refrigerant to outside air in the air heat exchanger 9 can be determined by a comparison between the refrigerant temperature Tr' at the refrigerant inlet of the air heat exchanger 9 and a refrigerant temperature at the refrigerant outlet of the air heat exchanger 9. In this case, when the refrigerant temperature at the refrigerant outlet of the air heat exchanger 9 is equal to or lower than the refrigerant temperature Tr' at the refrigerant inlet of the air heat exchanger 9, it can determined that heat absorption of refrigerant does not occur, and the bypass operation is performed.

Figure 6:
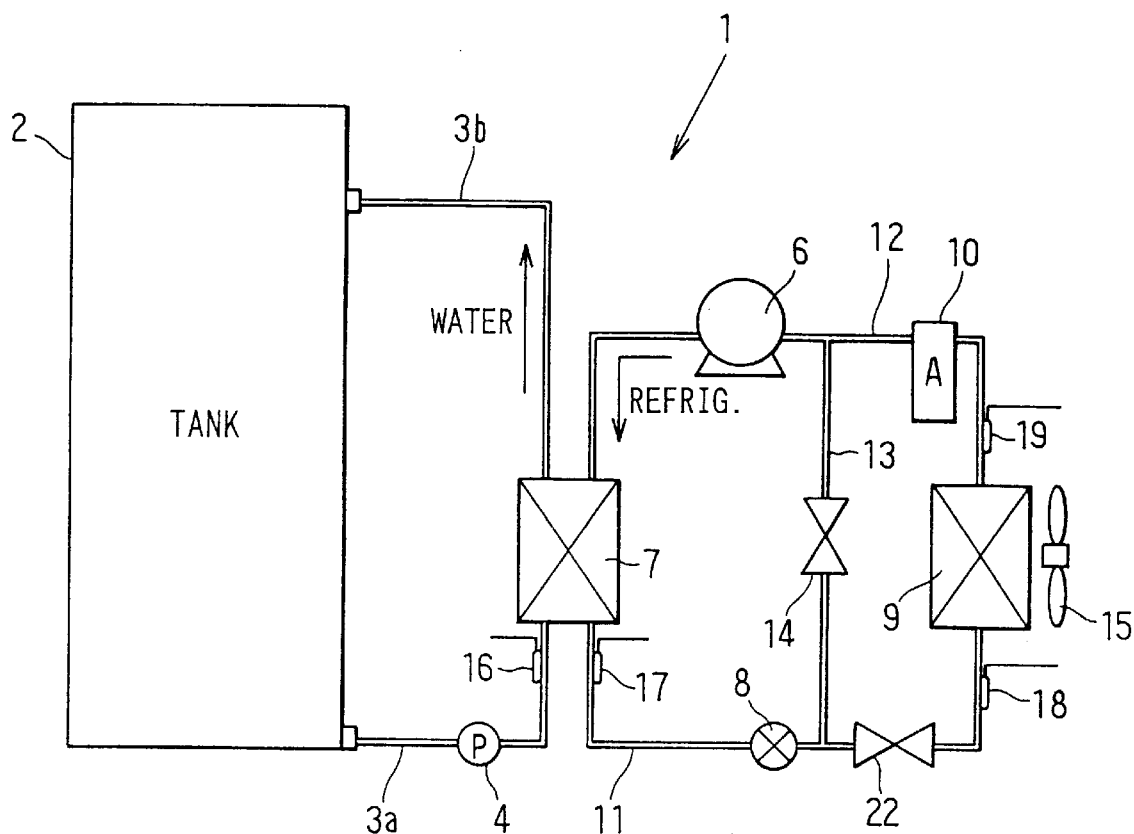
FIG. 6 is a schematic diagram of a heat-pump water heater according to a second preferred embodiment of the present invention.
Figure 7:
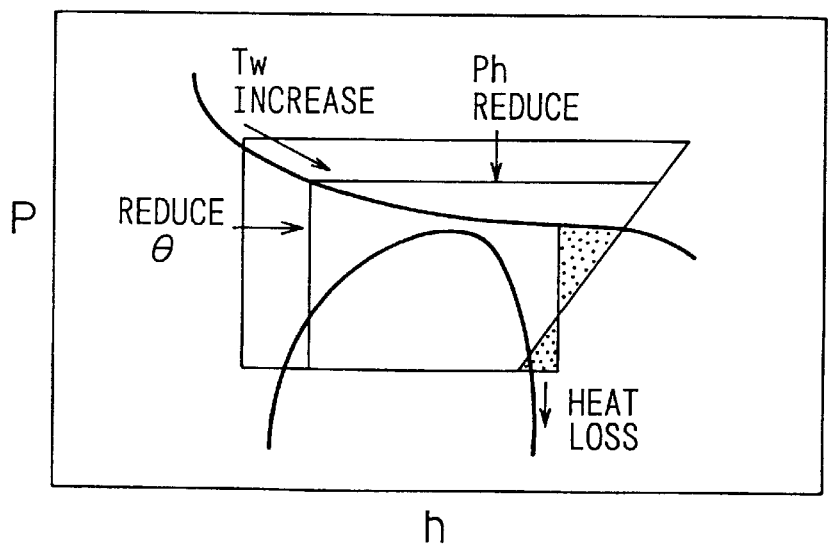
FIG. 7 is a p-h diagram for explaining a heat loss of refrigerant in a heat-pump water heater.

A second preferred embodiment of the present invention will be now described with reference to FIG. 6. FIG. 6 is a schematic view showing a heat-pump water heater 1 according to the second embodiment. In the second embodiment, as shown in FIG. 6, an electromagnetic valve 22 is provided in the low-pressure side refrigerant passage 12 between the expansion valve 8 and the air heat exchanger 9. Further, one end of the bypass pipe 13 is connected to the low-pressure side refrigerant pipe 12 between the expansion valve 8 and the electromagnetic valve 22, and the other end of the bypass pipe 13 is connected to the low-pressure side refrigerant pipe 12 between the accumulator 10 and the compressor 6.

In the second embodiment, similarly to the above-described first embodiment, the radiation condition on which the heat radiation from refrigerant to outside air will occur is determined based on the water temperature Tw flowing into the water heat exchanger 7, and the bypass operation is performed when the water temperature Tw is equal to or higher than 60° C. satisfying the radiation condition. On the other hand, when the water temperature Tw is lower than 60° C., the general cycle operation is performed. Alternatively, the radiation condition can be determined by the first heat-radiation determining means (step S21) and the second heat-radiation determining means (step S22) indicated in FIG. 4, and the bypass operation is performed when the radiation condition is satisfied.

In the bypass operation of the heat-pump water heater 1, both the bypass valve 14 and the electromagnetic valve 22 are opened, and the opening degree of the bypass valve 14 is made larger than the opening degree of the electromagnetic valve 22. That is, in the bypass operation, the electromagnetic valve 22 is slightly opened.

According to the second embodiment of the present invention, in the bypass operation of the heat-pump water heater 1, because refrigerant decompressed in the expansion valve 8 flows into the bypass pipe 13, durability of the bypass pipe 13 and the bypass valve 14 can be improved.

Further, because the electromagnetic valve 22 is slightly opened, refrigerant in the accumulator 10 can be circulated in the heat pump cycle so that low-pressure side refrigerant pressure in the heat pump cycle can be increased, and it can prevent the temperature and the pressure of refrigerant discharged from the compressor 6 from being greatly high. Because the electromagnetic valve 22 is slightly opened in the bypass operation, refrigerant flows into the air heat exchanger 9. However, in the bypass operation, because the outside fan 15 is stopped, the heat loss in the air heat exchanger 9 can be restricted at minimum.

Although the present invention has been fully described in connection with the preferred embodiments thereof with reference to the accompanying drawings, it is to be noted that various changes and modifications will become apparent to those skilled in the art.

For example, in the above-described embodiments, the other end of the bypass pipe 13 is connected to the low-pressure side refrigerant pipe 12 between the accumulator 10 and the compressor 6. However, the other end of the bypass pipe 13 may be connected to the low-pressure side refrigerant pipe 12 between the air heat exchanger 9 and the accumulator 10.

In the above-described embodiments, the present invention is typically applied to the heat-pump water heater 1 for heating water. However, the present invention may be applied to a heat-pump fluid heater for heating a fluid using the heat pump cycle as a heating source.

Such changes and modifications are to be understood as being within the scope of the present invention as defined by the appended claims.

What is claimed is:

1. A heat-pump water heater for heating water, comprising:
   a tank for storing water;
   a heat pump cycle for heating water, used as a heating source; and
   a control unit for controlling operation of the heat pump cycle, wherein:
   the heat pump cycle includes a compressor which compresses sucked refrigerant and discharges compressed refrigerant, a water heat exchanger which is disposed to perform a heat exchange between refrigerant from the compressor and water supplied from the tank, in such a manner that a flow direction of refrigerant is opposite to a flow direction of water in the water heat exchanger, an expansion valve decompressing refrigerant flowing from the water heat exchanger, an air heat exchanger disposed to perform a heat exchange between refrigerant decompressed in the expansion valve and outside air, an accumulator disposed between the air heat exchanger and the compressor, for separating refrigerant from the air heat exchanger into gas refrigerant and liquid refrigerant so that only gas refrigerant is introduced into the compressor, a bypass passage through which refrigerant from the water heat exchanger bypasses the expansion valve and the air heat exchanger, and an adjustment valve for adjusting a flow amount of refrigerant flowing through the bypass passage;

the control unit controls the operation of the heat pump cycle to set one of a general cycle operation where refrigerant flowing from the water heat exchanger is supplied to the air heat exchanger after being decompressed in the expansion valve, and a bypass operation where refrigerant from the water heat exchanger flows through the bypass passage while bypassing the expansion valve and the air heat exchanger;

the control unit has a water temperature sensor for detecting a water temperature flowing into the water heat exchanger, and a heat-radiation determining member which determines whether or not a heat radiation from refrigerant to outside air will occur in the air heat exchanger based on the water temperature;

the heat-radiation determining member determines that there is a possibility of the heat radiation from refrigerant to outside air in the air heat changer when the water temperature detected by the water temperature sensor is higher than a predetermined temperature; and the control unit performs the bypass operation when it is determined that the heat radiation will occur by the heat-radiation determining member.

2. The heat-pump water heater according to claim 1, further comprising:

a refrigerant temperature sensor detecting a refrigerant temperature flowing into the air heat exchanger wherein:

the heat-radiation determining member has first heat-radiation determining means for determining whether or not there is the possibility of the heat radiation from refrigerant to outside air in the air heat exchanger based on the water temperature, and second heat-radiation determining means which determines the heat radiation when the refrigerant temperature flowing into the air heat exchanger is higher than a temperature of outside air flowing into the air heat exchanger when the first heat-radiation determining means determines the possibility of the heat radiation; and the control unit performs the bypass operation when the second heat-radiation determining means determines that the heat radiation will occur.

3. The heat-pump water heater according to claim 1, further comprising:

a first refrigerant temperature sensor detecting a refrigerant temperature flowing into the air heat exchanger; and a second refrigerant temperature sensor detecting a refrigerant temperature flowing out from the air heat exchanger, wherein:

the heat-radiation determining member has first heat-radiation determining means for determining whether or not there is the possibility of the heat radiation from refrigerant to outside air in the air heat exchanger based on the water temperature, and second heat-radiation determining means for determining the heat radiation based on a comparison between the refrigerant temperature flowing into the air heat exchanger and the refrigerant temperature flowing out from the air heat exchanger when the first heat-radiation determining means determines the possibility of the heat radiation; and the control unit performs the bypass operation when the second heat-radiation determining means determines that the heat radiation will occur.

4. The heat-pump water heater according to claim 1, wherein, in the general cycle operation, the control unit controls the opening degree of the expansion valve so that a temperature difference between the water temperature flowing into the water heat exchanger and a refrigerant temperature flowing out from the water heat exchanger becomes approximately constant.

5. The heat-pump water heater according to claim 1, wherein, in the bypass operation, the control unit controls the opening degree of the adjustment valve based on one of a high-pressure side refrigerant pressure in the heat pump cycle and a water-heating capacity of the heat pump cycle.

6. The heat-pump water heater according to claim 1, wherein in the heat pump cycle, refrigerant discharged from the compressor has a pressure equal to or higher than the critical pressure of the refrigerant.

7. The heat-pump water heater according to claim 6, wherein in the heat pump cycle, carbon dioxide is used as refrigerant.

8. A heat-pump water heater for heating water, comprising:

a tank for storing water;

a heat pump cycle for heating water, used as a heating source; and a control unit for controlling operation of the heat pump cycle, wherein:

the heat pump cycle includes a compressor which compresses sucked refrigerant and discharges compressed refrigerant, a water heat exchanger which is disposed to perform a heat exchange between refrigerant from the compressor and water supplied from the tank, in such a manner that a flow direction of refrigerant is opposite to a flow direction of water in the water heat exchanger, an expansion valve decompressing refrigerant flowing from the water heat exchanger, an air heat exchanger disposed to perform a heat exchange between refrigerant decompressed in the expansion valve and outside air, an accumulator disposed between the air heat exchanger and the compressor, for separating refrigerant from the air heat exchanger into gas refrigerant and liquid refrigerant so that only gas refrigerant is introduced into the compressor, a first adjustment valve, disposed between the expansion valve and the air heat exchanger in a refrigerant flow direction, for adjusting a flow amount of refrigerant from the expansion valve to the air heat exchanger, a bypass passage through which refrigerant from the expansion valve bypasses the first adjustment valve and the air heat exchanger, and a second adjustment valve for adjusting a flow amount of refrigerant flowing through the bypass passage;

the control unit controls the operation of the first and second adjustment valves to set one of a general cycle operation where the first adjustment valve is opened and the second adjustment valve is closed, and a bypass operation where both the first and second adjustment valves are opened and an opening degree of the first adjustment valve is made smaller than that of the second adjustment valve;

the control unit has a water temperature sensor for detecting a water temperature flowing into the water heat exchanger, and a heat-radiation determining member which determines whether or not a heat radiation from refrigerant to outside air causes in the air heat exchanger based on the water temperature; and the control unit performs the bypass operation when the heat radiation is determined by the heat-radiation determining member.

9. The heat-pump water heater according to claim 8, wherein:

the heat-radiation determining member has first heat-radiation determining means for determining whether or not there is a possibility of the heat radiation from refrigerant to outside air in the air heat exchanger based on the water temperature, and second heat-radiation determining means for determining the heat radiation based on a comparison between a refrigerant temperature flowing into the air heat exchanger and a temperature of outside air flowing into the air heat exchanger when the first heat-radiation determining means determines the possibility of the heat radiation; and the control unit performs the bypass operation when the second heat-radiation determining means determines that the heat radiation causes.

10. The heat-pump water heater according to claim 8, wherein:

the heat-radiation determining member has first heat-radiation determining means for determining whether or not there is a possibility of the heat radiation from refrigerant to outside air in the air heat exchanger based on the water temperature, and second heat-radiation determining means for determining the heat radiation based on a comparison between a refrigerant temperature flowing into the air heat exchanger and a refrigerant temperature flowing out from the air heat exchanger when the first heat-radiation determining means determines the possibility of the heat radiation; and the control unit performs the bypass operation when the second heat-radiation determining means determines that the heat radiation causes.

11. The heat-pump water heater according to claim 8, wherein, in the general cycle operation, the control unit controls the opening degree of the expansion valve so that a temperature difference between the water temperature flowing into the water heat exchanger and a refrigerant temperature flowing out from the water heat exchanger becomes approximately constant.

12. The heat-pump water heater according to claim 8, wherein, in the bypass operation, the control unit controls the opening degree of the second adjustment valve based on one of a high-pressure side refrigerant pressure in the heat pump cycle and a water-heating capacity of the heat pump cycle.

13. The heat-pump water heater according to claim 8, wherein in the heat pump cycle, refrigerant discharged from the compressor has a pressure equal to or higher than the critical pressure of the refrigerant.

14. The heat-pump water heater according to claim 13, wherein in the heat pump cycle, carbon dioxide is used as refrigerant.

15. A heat-pump fluid heater for heating a fluid using a heat pump cycle as a heating source, comprising:

a compressor which compresses sucked refrigerant and discharges compressed refrigerant;

a fluid heat exchanger which is disposed to perform a heat exchange between refrigerant from the compressor and the fluid;

an expansion valve decompressing refrigerant flowing from the fluid heat exchanger;

an air heat exchanger disposed to perform a heat exchange between refrigerant decompressed in the expansion valve and outside air;

a bypass pipe defining a bypass passage through which refrigerant from the fluid heat exchanger bypasses at least the air heat exchanger; and an adjustment valve for adjusting a flow amount of refrigerant flowing through the bypass passage, wherein:

the control unit is disposed to set one of a general cycle operation where all refrigerant flowing from the fluid heat exchanger is supplied to the air heat exchanger after being decompressed in the expansion valve, and a bypass operation where refrigerant from the fluid heat exchanger mainly flows through the bypass passage while bypassing at least the air heat exchanger;

the control unit has a fluid temperature sensor for detecting a fluid temperature flowing into the fluid heat exchanger, and a heat-radiation determining member which determines whether or not a heat radiation from refrigerant to outside air causes in the air heat exchanger based on the fluid temperature; and the control unit performs the bypass operation when the heat radiation is determined by the heat-radiation determining member.

16. The heat-pump fluid heater according to claim 15, wherein:

the heat-radiation determining member has first heat-radiation determining means for determining whether or not there is a possibility of the heat radiation from refrigerant to outside air in the air heat exchanger based on the fluid temperature, and second heat-radiation determining means for determining the heat radiation based on a comparison between a refrigerant temperature flowing into the air heat exchanger and a temperature of outside air flowing into the air heat exchanger when the first heat-radiation determining means determines the possibility of the heat radiation; and the control unit performs the bypass operation when the second heat-radiation determining means determines that the heat radiation causes.

17. The heat-pump fluid heater according to claim 16, wherein:

the heat-radiation determining member has first heat-radiation determining means for determining whether or not there is a possibility of the heat radiation from refrigerant to outside air in the air heat exchanger based on the fluid temperature, and second heat-radiation determining means for determining the heat radiation based on a comparison between a refrigerant temperature flowing into the air heat exchanger and a refrigerant temperature flowing out from the air heat exchanger when the first heat-radiation determining means determines the possibility of the heat radiation; and the control unit performs the bypass operation when the second heat-radiation determining means determines that the heat radiation causes.

* * * * *